US006583953B1

(12) United States Patent
Han et al.

(10) Patent No.: US 6,583,953 B1
(45) Date of Patent: Jun. 24, 2003

(54) SILICON CARBIDE OVERCOATS FOR INFORMATION STORAGE SYSTEMS AND METHOD OF MAKING

(75) Inventors: Hua Han, Fremont, CA (US); Francis W. Ryan, Martinez, CA (US); Carolyn S. Robinson, San Jose, CA (US); Thomas P. Ultican, San Jose, CA (US)

(73) Assignee: Mark Lauer, Pleasanton, CA (US)

( * ) Notice: Subject to any disclaimer, the term of this patent is extended or adjusted under 35 U.S.C. 154(b) by 0 days.

(21) Appl. No.: 09/352,544

(22) Filed: Jul. 12, 1999

(51) Int. Cl.⁷ .............................. G11B 5/187; G11B 5/84
(52) U.S. Cl. ..................................... 360/122; 29/603.07
(58) Field of Search .............................. 360/122, 235.1, 360/235.2, 235.3, 235.8, 235.9, 236.5, 236.6, 125, 126, 131, 135; 427/562; 29/603.07

(56) References Cited

U.S. PATENT DOCUMENTS

| 5,069,092 A | 12/1991 | Schmatz et al. .............. 82/1.11 |
| 5,159,508 A | 10/1992 | Grill et al. ................... 360/103 |
| 5,175,658 A | 12/1992 | Chang et al. ................. 360/103 |
| 5,271,802 A | 12/1993 | Chang et al. ................. 156/643 |
| 5,336,550 A | 8/1994 | Ganapathi et al. ........... 428/216 |
| 5,480,695 A * | 1/1996 | Tenhover et al. ........... 428/65.5 |
| 5,535,073 A | 7/1996 | Brezoczky et al. ......... 360/105 |
| 5,617,273 A | 4/1997 | Carr et al. ................... 360/105 |
| 5,670,253 A | 9/1997 | Chiu et al. ................... 428/336 |
| 5,705,287 A | 1/1998 | Doerner et al. ............. 428/694 |
| 5,768,055 A | 6/1998 | Tian et al. ................... 360/103 |
| 5,781,376 A | 7/1998 | Tsukamoto ................. 360/103 |
| 5,800,931 A | 9/1998 | Lee et al. .................... 428/611 |
| 5,805,380 A | 9/1998 | Ishihara et al. ............. 360/103 |
| 5,808,832 A | 9/1998 | Chen et al. .................. 360/103 |
| 5,858,477 A * | 1/1999 | Veerasamy et al. ......... 427/562 |
| 5,862,013 A * | 1/1999 | Haga .......................... 360/103 |
| 5,864,452 A * | 1/1999 | Hirano et al. ............... 360/122 |

OTHER PUBLICATIONS

Kaus et al., Sliders for Magnetic Heads of Surface–Hardened Silicon With Integrated Electronic Components, IBM Technical Disclosure Bulletin, Dec. 1982, p. 3173.

* cited by examiner

Primary Examiner—George J. Letscher
(74) Attorney, Agent, or Firm—Mark Lauer

(57) ABSTRACT

An overcoat overcoat for a head and/or media surface is made of a hard, dense and durable silicon-carbide (SiC) layer. The SiC layer does not require an interlayer to promote adhesion to underlying magnetic or ceramic layers, thus reducing head-media spacing and increasing areal storage density and resolution. The SiC is formed in a manner that creates an overcoat with density, hardness, durability and corrosion resistance similar to DLC. The SiC overcoat formation process also penetrates less into underlying magnetic layers than is conventional, reducing further the spacing of active elements by inactive coatings. In an alternative embodiment, SiC may be formed by this process as an interlayer for a carbon overcoat such as DLC or ta-C. This allows the overcoat to be made thinner, since the interlayer is hard and dense, while retaining the chemical and other surface properties of the carbon overcoat.

20 Claims, 5 Drawing Sheets

SILICON CARBIDE OVERCOATS FOR INFORMATION STORAGE SYSTEMS AND METHOD OF MAKING

TECHNICAL FIELD

The present invention relates to electromechanical information storage systems.

BACKGROUND OF THE INVENTION

It is well known in the field of magnetic information storage systems that a means for increasing storage density and signal resolution is to reduce the separation between a transducer and associated media. For many years, devices incorporating flexible media, such as floppy disk or tape drives, have employed a head in contact with the flexible media during operation in order to reduce the head-media spacing. Recently, hard disk drives have been designed which can durably operate with high-speed contact between the hard disk surface and the head.

A head for a hard disk drive typically includes microscopic solid layers formed on a ceramic or ferrite substrate, and can easily be damaged by such high-speed contact. Moreover, a head can also damage a disk during such contact, which may occur at speeds exceeding ten meters per second. In an attempt to prevent such damage, which can destroy a disk and the data stored thereon, hard disk media is conventionally coated with a carbon or carbon-based overcoat that is hard and durable. Similarly, a slider that carries a transducer for a disk drive head is usually formed of a hard durable material, such as alumina ($Al_2O_3$)/titanium-carbide (TiC), which is commonly referred to as AlTiC. Another suitable slider or disk material is silicon carbide (SiC), which may be sintered or formed by high-temperature chemical vapor deposition (CVD), as described in U.S. Pat. No. 5,465,184 to Pickering et al.

Another means for increasing signal resolution that has become increasingly common is the use of magnetoresistive (MR) or other sensors for a head. MR elements may be used along with inductive writing elements, or may be separately employed as sensors. While MR sensors offer greater sensitivity than inductive transducers, they are even more prone to damage from high-speed contact with a hard disk surface, and may also suffer from corrosion. For these reasons, air bearing surfaces (ABS) for heads containing MR sensors are conventionally coated with a hard, durable carbon or carbon-based overcoat.

Current methods for making overcoats for slider or disk surfaces include sputtering or ion beam chemical vapor deposition (IBCVD) to form diamond-like carbon (DLC) films. More recently, cathodic arc deposition has been used to form tetrahedral-amorphous carbon (ta-C) films having even greater hardness. Employment of harder films allows the thickness of the films to be reduced, which can help to reduce head-media spacing.

DLC and ta-C films have a high stress as well as high hardness, and do not adhere well to slider ABS or magnetic layers, and so an adhesion layer of Si or $Si_3N_4$ is conventionally formed to help with stress relief and adhesion. FIG. 1 depicts such a conventional DLC coating 20 that has been formed on an interlayer 22 of Si or $Si_3N_4$, which in turn was formed on a substrate 25 that may be a magnetic or ceramic layer of a head. The DLC coating 20 conventionally has a thickness that is about four times that of the interlayer 22. Thus a 80 Å layer 20 of DLC may be formed on a 20 Å interlayer 22 of $Si_3N_4$, to create a minimum head spacing of 100 Å, while a similar spacing may be present on the media. Further head-media spacing conventionally occurs due to penetration of energetic interlayer ions into underlying magnetic layers, deadening a portion of those magnetic layers.

It is not clear that the minimum head-medium spacing due to these layers can be reduced substantially without encountering problems in overcoat durability and interlayer continuity. For example, a 10 Å interlayer may be only a few atoms thick, and may not provide adequate adhesion even if one assumes that the somewhat thicker carbon overcoat can withstand high-speed head-disk contact without damage or removal.

SUMMARY OF THE INVENTION

The present invention provides a thinner overcoat for a head and/or media surface, substantially reducing head-media spacing and increasing areal storage density and resolution. The overcoat is hard and durable silicon-carbide (SiC), and does not require an interlayer to promote adhesion to underlying magnetic or ceramic layers.

The SiC is formed in a manner that creates an overcoat with density, hardness, durability and corrosion resistance similar to DLC. The SiC overcoat may also be formed with a process that penetrates less into an underlying magnetic layer than is conventional, reducing further the spacing of active elements by inactive coatings.

Alternatively, SiC may be formed by this process as an interlayer for a carbon overcoat such as DLC or ta-C. This allows the overcoat to be made thinner, since the interlayer is hard and dense, while retaining the chemical and other surface properties of the carbon overcoat.

DESCRIPTION OF THE PREFERRED EMBODIMENT

Figure 1:
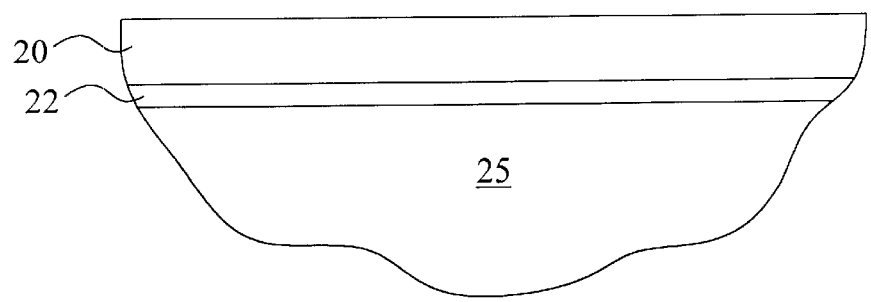
FIG. 1 is a cutaway cross-sectional view of a prior art device having a conventional overcoat and interlayer.
Figure 2:
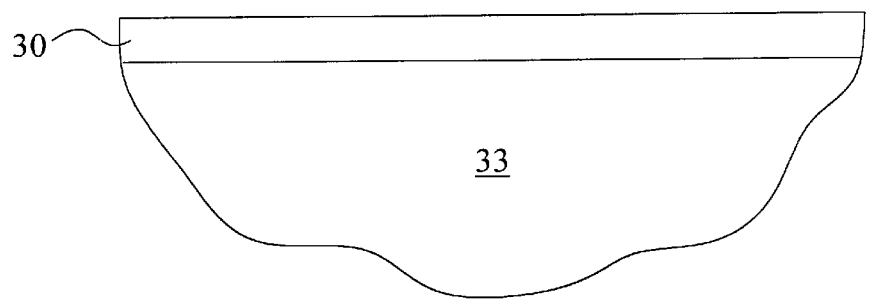
FIG. 2 is a cutaway cross-sectional view of a device of the present invention having an SiC overcoat without an interlayer.

Referring now to FIG. 2, a SiC overcoat 30 has been formed on a substrate 33 that may be a magnetic or ceramic layer of a head. Alternatively, substrate 33 may represent a magnetic media layer of a disk. The SiC overcoat 30 adheres well to the substrate 33 without the need for an adhesion layer, dramatically lowering the physical spacing between the head and media. For reasons discussed below, unlike bulk SiC that may be obtained as wafers and may conventionally form a support substrate for a head or disk, the SiC overcoat 30 does not chip or fragment in a hard disk drive environment. Further, unlike typical SiC films, the overcoat 30 is extremely dense and defect-free, providing an excellent barrier to corrosion for example. Due to these attributes, the overcoat 30 can be made very thin, and may even be less than about 10 Å in thickness for the situation in which high-speed contact is avoided and the overcoat functions primarily as a corrosion barrier. A currently preferred thickness for the SiC overcoat 30 is in a range between about 20 Å and 60 Å, although a higher or lower thickness may be desirable for certain applications.

Figure 3:
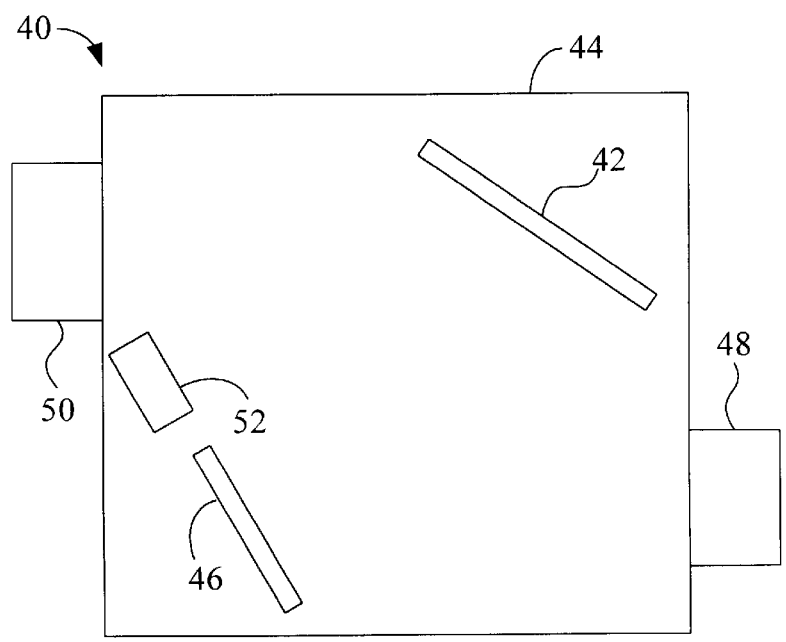
FIG. 3 is a diagram of an apparatus used to form the SiC overcoat of FIG. 2.

FIG. 3 illustrates an apparatus 40 that is used for forming the hard, dense, nonporous SiC layers employed in the present invention. A rotatable platen or platter 42 that may hold one or more substrates is disposed within a chamber 44 that may be maintained at a pressure on the order of $10^{-4}$ Torr or less, the chamber pressure maintained by a conventional pump, not shown. A grounded SiC wafer target 46 faces the substrate-holding platter 42, and is also aligned with an ion beam source 48. The ion beam source 48 directs a beam of ions such as argon (Ar+) onto the target 46, ejecting atoms and/or molecules from the target, some of which impinge upon the substrates held on the rotating platter to form a SiC coating. This process is termed ion beam sputtering (IBS).

At the same time, a second ion beam source 50 directs ions from a material such as Ar or other chemically nonreactive elements at the platter 42. The ions from source 50 pass through an electron cloud created by electron source 52 so that electrically as well as chemically neutral atoms are directed at the substrate-holding platter 42. It is believed that these atoms tend to remove deposited SiC that is weakly bound to the substrates on platter 42, leaving SiC that is strongly bonded to the substrates. The neutral atom bombardment may also dislodge SiC molecules from microscopic peaks such as those forming over nucleation centers, filling in nearby valleys to form a stronger, denser SiC film. While atoms from the SiC target are preferably directed at an angle somewhat close to perpendicular to the substrate surfaces to be coated, the neutral atoms from sources 50 and 52 may be directed at a further angle from perpendicular, which may dislodge atoms from microscopic peaks without removing atoms from valleys, smoothing, hardening and densifying the SiC coating. The neutral atom beam may optionally be directed at a grazing angle that is much closer to parallel than perpendicular to the substrate surfaces, in order to further the differential impingement upon nanoscale peaks compared to valleys. Note that prior to formation of an SiC film, the neutral ion beam from sources 50 and 52 may be used to clean the substrate surfaces, at a similar or different angle than that later employed during hardening and densification of the SiC.

Table 1 compares some properties of the SiC films of the present invention with convention overcoat materials such as DLC and more recently employed ta-C. Note that the SiC has a density, hardness and stress somewhat between the DLC and ta-C. The contact angle with water offers a measure of stiction performance of the material, as a high contact angle implies a low surface energy, and less capillary adhesion between the surface and the opposed surface of the head-disk interface. A head with a high contact angle for a disk-facing overcoat may also accumulate less lubricant from the disk surface.

TABLE 1

|  | DLC | SiC | Ta—C |
|---|---|---|---|
| Density [g/cm$^3$] | 1.5–2.1 | 1.7–2.4 | 3.0–3.5 |
| Hardness [Gpa] | 15–20 | 18–23 | 30–60 |
| Stress [Gpa] | 2.0–3.0 | 1.5–2.0 | 3.0–4.0 |
| Contact Angle [degrees] | 60–70 | 60–70 | 75–85 |

Figure 4:
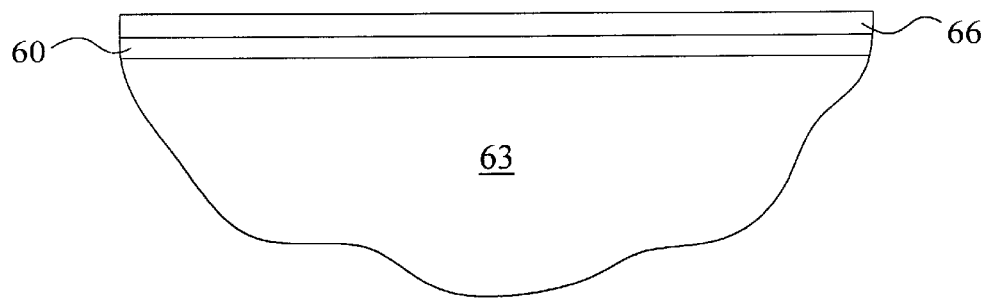
FIG. 4 is a cutaway cross-sectional view of a device of the present invention including an interlayer of SiC and a ta-C overcoat.

FIG. 4 illustrates the employment of a hard, dense and defect free SiC material of the present invention as an interlayer 60 between a substrate 63 and a hard carbon overcoat layer 66. The substrate 63 may be a transducer or ceramic layer of a head or may be a media layer of a medium. The overcoat layer 66 may contain DLC or ta-C, which are denoted in this application as sp$^3$ carbon in reference to the type of bonds that predominate, and which can be made much thinner than is conventional due to the reinforcement provided by the underlying SiC interlayer 60. In addition, the interlayer 60 forms an adhesion layer for the hard carbon overcoat layer 66 that may have improved adhesive properties over conventional silicon-based adhesion layers. Both the interlayer 60 and the overcoat layer 66 can have a thickness as little as about 10 Å or less, although a greater thickness may be preferable for some applications. Having a hard carbon overcoat layer 66 allows the employment of a known surface chemistry and texture for a head-disk interface.

Figure 5:
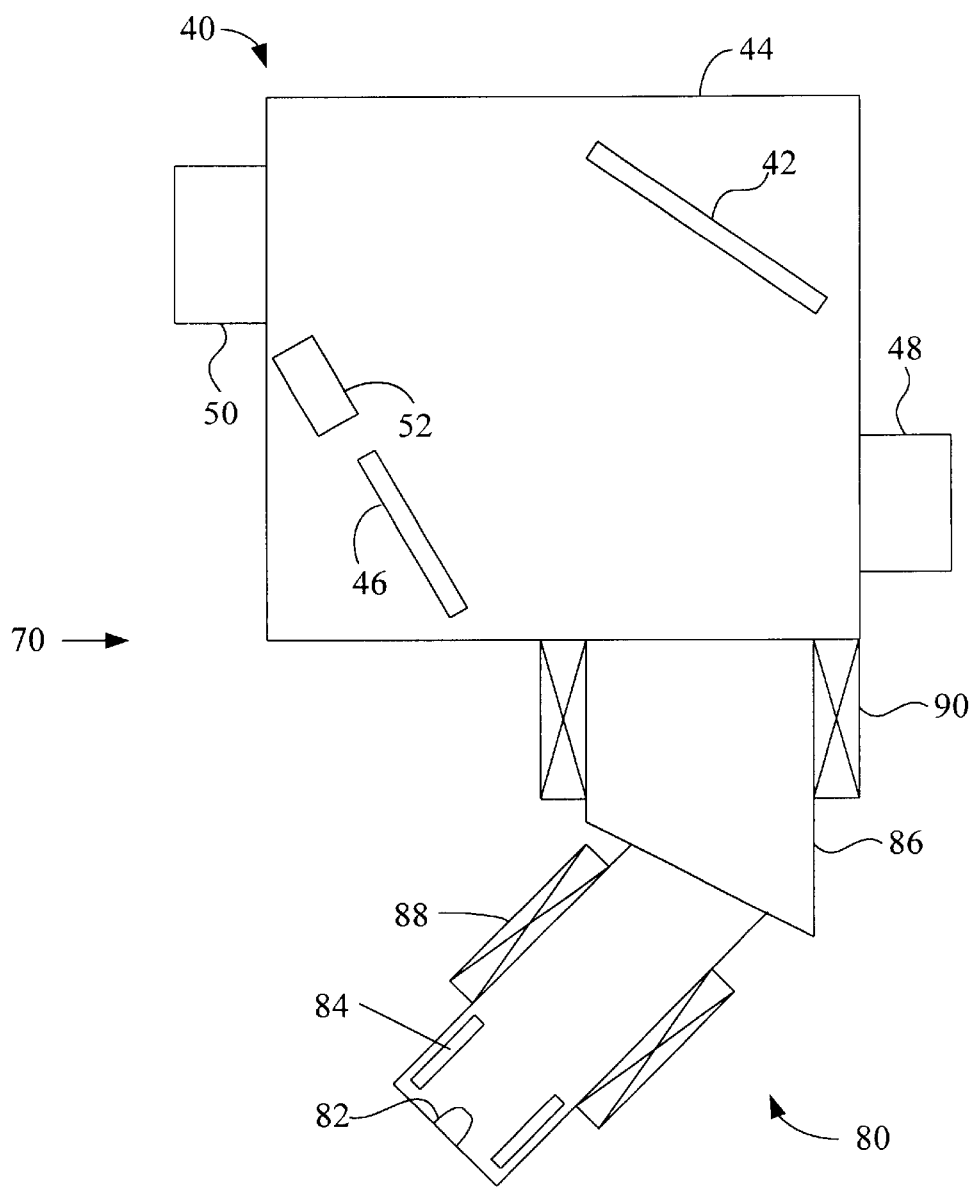
FIG. 5 is a diagram of an apparatus used to form the SiC interlayer and ta-C overcoat of FIG. 4.

FIG. 5 depicts an apparatus 70 that may be used to form the interlayer 60 and overcoat layer 66 shown in FIG. 4. For conciseness, the apparatus 40 illustrated in FIG. 3 for forming hard, dense SiC layers is reproduced in FIG. 5 in combination with a filtered cathodic arc device 80 employed for forming ta-C, apparatuses 40 and 80 together forming apparatus 70. To form the structure shown in FIG. 4, the dense interlayer 60 of SiC is first formed in a manner much as described above with regard to layer 30 of FIG. 2, which for brevity will not be repeated here.

Apparatus 80 provides for deposition of hard carbon overcoat layer 66 on interlayer 60, which has been formed on substrates positioned on the moveable palate 42. A carbon cathode 82 is disposed near an anode 84, the anode and cathode disposed in an evacuated chamber 86 in fluid communication with the chamber 44 that houses the substrate-holding palate 42. An arc is created between the anode and cathode that generates carbon ions as well as some macroparticles at the cathode, the ions and macroparticles traveling generally toward the cylindrical, water cooled anode. A focusing solenoid 88 located near the anode directs carbon ions and to some extent the macroparticles toward a filtering solenoid 90, which filters out most macroparticles that are generated by the arc, while guiding the carbon ions toward the substrate. Stated differently, the charge to mass ratio of the carbon ions is much higher than that of the macroparticles, causing the ions to be guided through the path defined by the solenoid 90 while the macroparticles fly out of that path. Neutral atoms provided by ion beam source 50 and electron source 52 may be employed during this ta-C deposition to dislodge any macroparticles that were not removed by the filter, strengthening the hard carbon coating 66.

Figure 6:
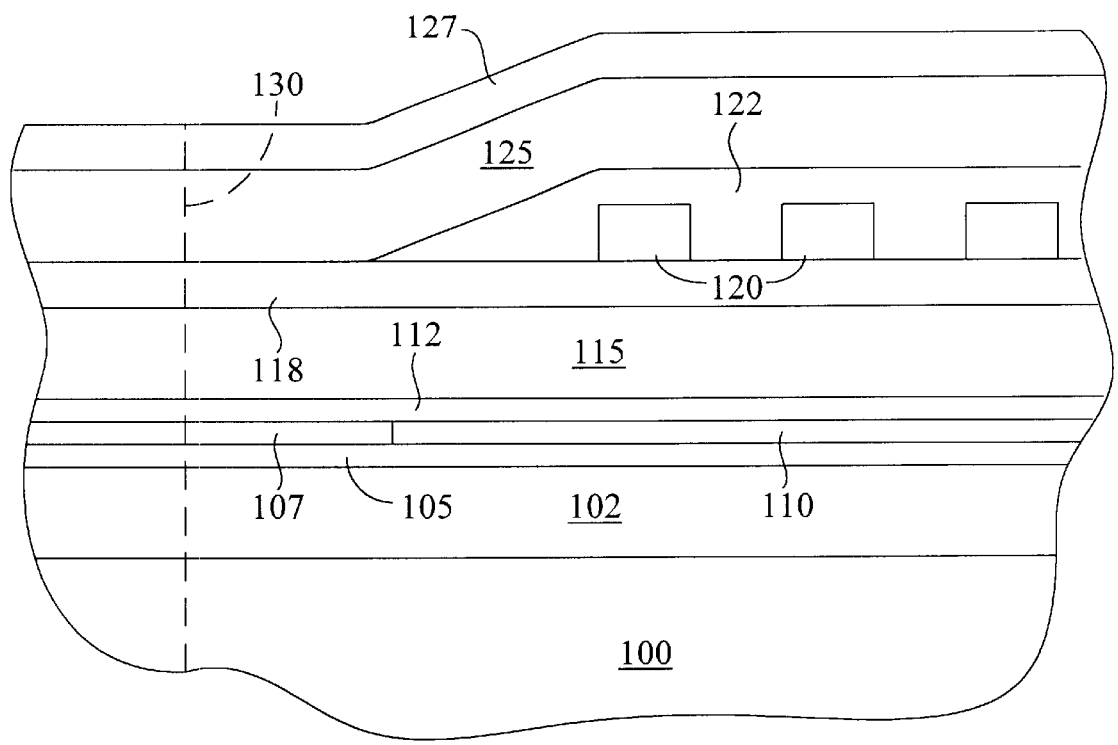
FIG. 6 is a cutaway cross-sectional view of a partially formed head of the present invention.

In FIG. 6, some conventional initial steps in forming a head of the present invention are shown. The head has been formed on a wafer substrate 100 that may be made of AlTiC, SiC or other known materials, the head typically being mass-produced along with thousands of other heads. After polishing and preparing a surface of the substrate 100, a first magnetically permeable layer 102 is formed which will function as a magnetic shield. A first read gap layer 105 of nonmagnetic, electrically insulating material such as alumina is then formed, on top of which a magnetoresistive (MR) sensor 107 is formed. The MR sensor 107 may be an anisotropic magnetoresistive (AMR) sensor, canted current sensor, spin valve (SV) sensor, giant magnetoresistive (GMR) sensor, or other known sensor, the details of which are known in the art and omitted here for conciseness. After the MR sensor 107 has been defined a back gap 110 and second read gap 112 of nonmagnetic material such as alumina are formed, optionally at the same time. A first pole layer 115 of magnetically permeable material such as permalloy that also serves as a shield for the sensor 107 is then formed. A nonmagnetic, electrically insulating write gap 118 of material such as alumina is formed on the pole layer, and a conductive coil 120 is formed on the write gap 118, the coil surrounded by nonmagnetic, electrically insulating material 122 such as baked photoresist. A second pole layer 125 of magnetically permeable material is then formed, and a protective coating 127 of alumina, DLC or other materials is conventionally formed. The substrate and thin film layers are then diced along line 130 and other lines, not shown, forming perhaps thousands of heads from a single wafer 100.

Figure 7:
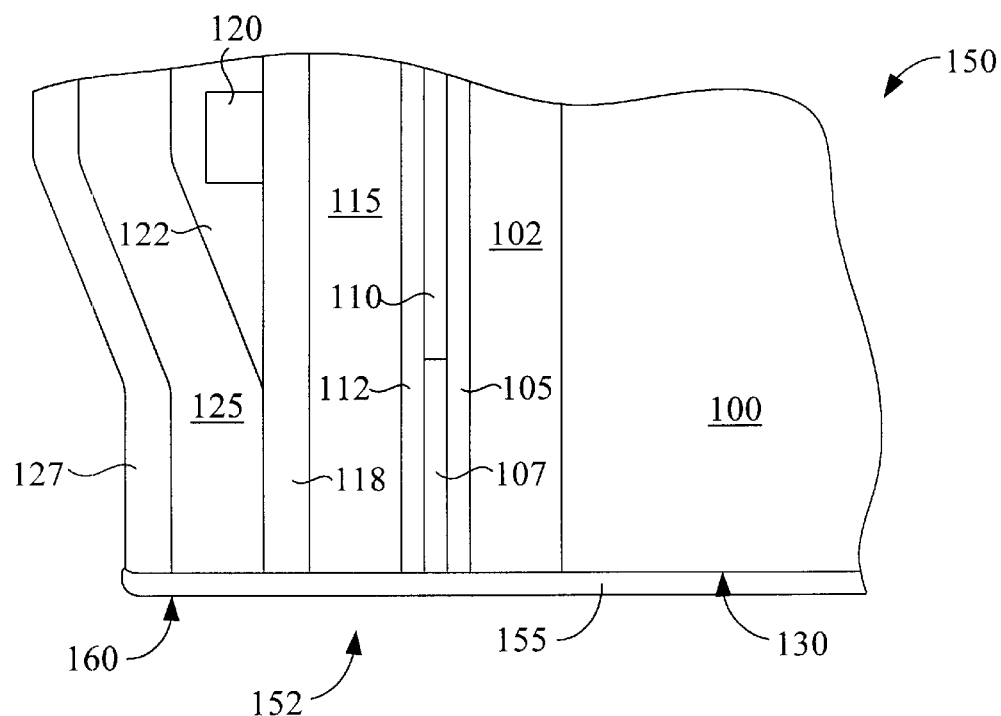
FIG. 7 is a cutaway cross-sectional view of the head of FIG. 6 with an SiC overcoat forming a media-facing surface.

A portion of an individual head 150 having a transducer 152 formed by the above process is shown in FIG. 7. The head 150 has been rotated to expose cut surface 130 and is held in a row along with other diced heads for forming air-bearing or media-facing surfaces. Surface 130 for the row of heads is lapped or polished while a transfer tool monitors resistance of sensors such as MR sensor 107 for an indication of when lapping has been optimized. After lapping and cleaning, a platter containing rows of heads may be moved to an apparatus such as shown in FIG. 3 or FIG. 5. Initially, the head surfaces such as surface 130 may be cleaned by neutral atom bombardment, as described above regarding FIGS. 3 and 5, during rotation at various angles. A dense, hard, essentially defect-free overcoat 155 of SiC is then formed on the cleaned surface 130 by IBS in combination with neutral atom bombardment, as described above. The SiC coating may have a thickness in a range between about 8 Å to 60 Å, and demonstrates excellent resistance to corrosion and wear, as well as low stiction. Stiction may also be favorably affected by interaction of a media-facing surface 160 formed by the SiC coating 155 with a disk coating made of a different material, such as conventional DLC. Alternatively and as described above, the SiC coating may provide a dense, hard adhesion layer for a DLC or ta-C overcoat, not shown in this figure.

Figure 8:
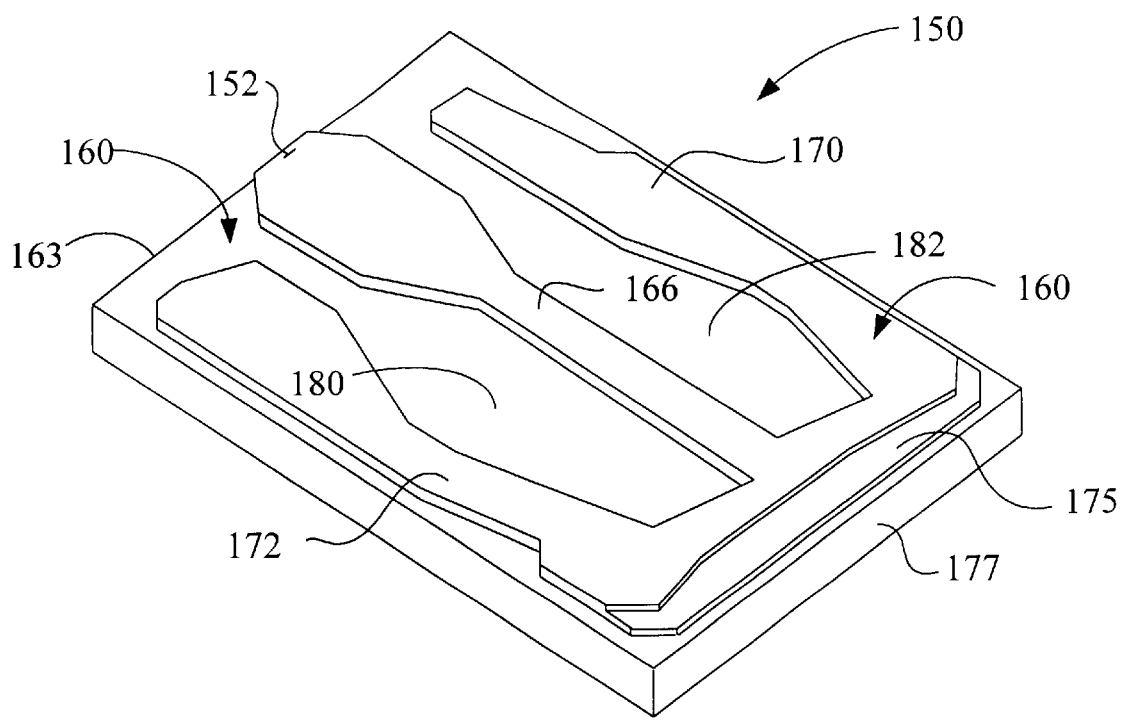
FIG. 8 is a perspective view of the head of FIG. 7 showing the media-facing surface.

After formation of the hard overcoat 155 containing SiC on surface 130, head 150 may be shaped by masking and ion beam or reactive ion etching, for example, into surface patterns known to be favorable for high speed, closely-spaced interaction with a disk, for instance. FIG. 8 illustrates a media-facing side of the head 150 of FIG. 7 after such masking and etching. The transducer 152 is visible through the SiC coating near a trailing end 163 of the media-facing surface 160 of the head. The media-facing or air-bearing surface (ABS) 160 has a raised center rail 166 and a pair of side rails 170 and 172. The transducer 152 is located near a trailing end of the center rail 166. A step 175 is located near a front end 177 of the head 150. Recessed areas 180 and 182 are located between the rails, providing stability of the head at various speeds.

Figure 9:
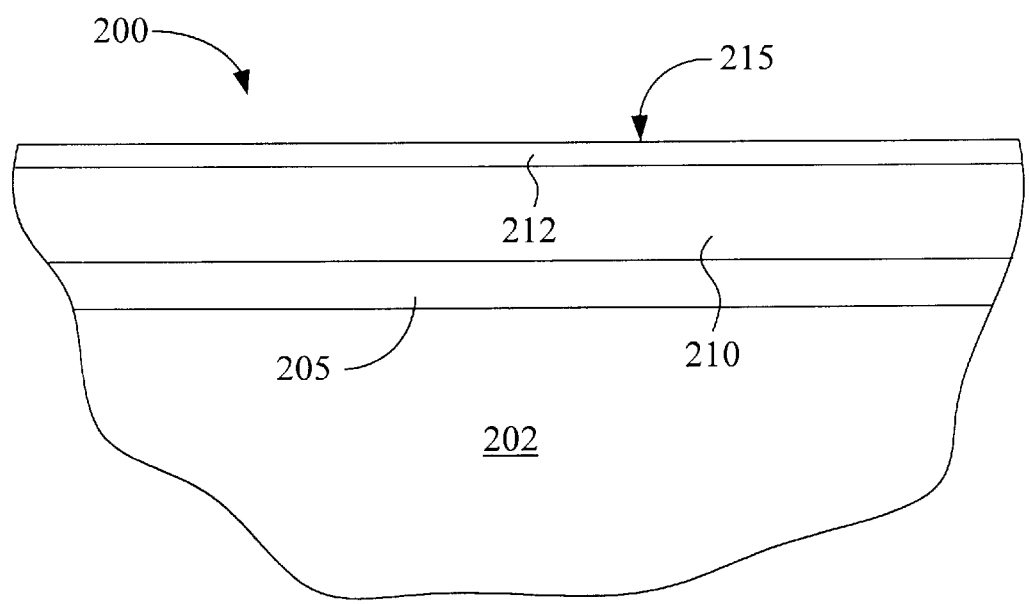
FIG. 9 is a cutaway cross-sectional view of a disk of the present invention having an SiC overcoat.

In FIG. 9 a portion of a disk 200 of the present invention is shown. The disk 200 includes a wafer substrate 202 that may be made of glass, SiC, aluminum, or any of a number of other materials known to be used for this purpose. The substrate may or may not be roughened or patterned, as is known, in the art, and is covered with an underlayer 205 that may provide adhesion and a desired structure for a media layer 210 formed on the underlayer. The media layer 210 may be a conventional cobalt (Co) based alloy, which may include elements such as chromium (Cr), platinum (Pt) and tantalum (Ta), for instance. Although a single media layer 210 is shown for conciseness, layer 210 may actually represent several layers as is known, and may be designed for longitudinal or perpendicular data storage. The underlayer 205 may include Cr, nickel aluminum (NiAl), magnesium oxide (MgO) or other materials known in the art, and may be formed of more than one layer. Atop the media layer 210 a thin layer 212 of SiC is formed according to the present invention, creating a dense, hard surface 215 for the disk 200. The layer 212 may be formed in an apparatus including elements such as represented in FIGS. 3 and 5. Formation of layer 212 may begin with a cleaning step of bombardment by neutral atoms, followed by neutral atom beam assisted IBS of SiC. Layer 212 may have a thickness in a range between about 8 Å to 50 Å and demonstrates excellent resistance to corrosion and wear, as well as low stiction. Alternatively and as described above, the SiC layer 212 may provide a dense, hard adhesion layer for an ultrathin DLC or ta-C surface layer, not shown in this figure.

Figure 10:
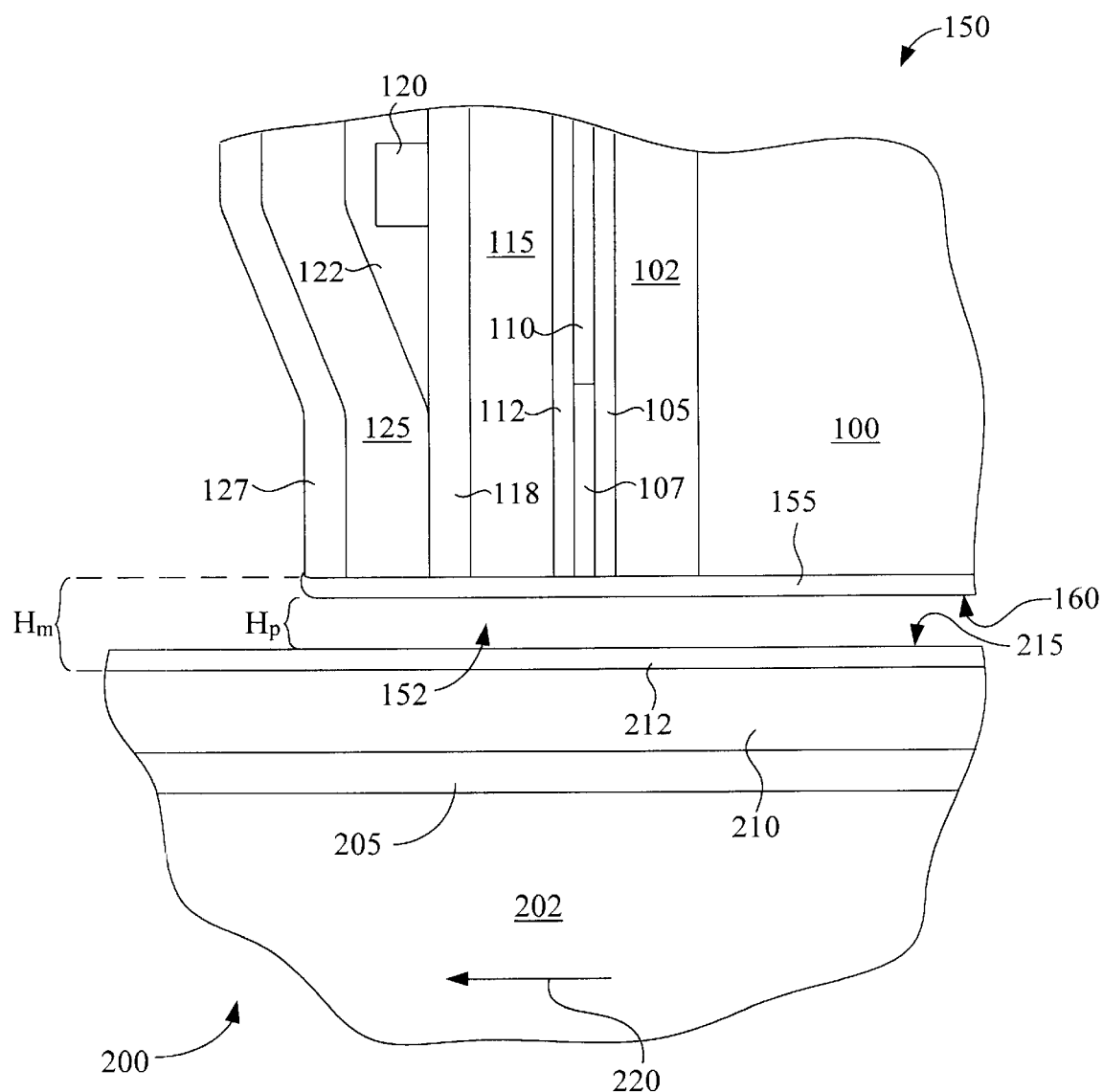
FIG. 10 is a cutaway cross-sectional view of the head of FIGS. 7 and 8 interacting with the disk of FIG. 9 during operation in a disk drive.

FIG. 10 shows the head 150 of FIGS. 7 and 8 in operation with the disk 200 of FIG. 9, such as within a disk drive. The disk is moving relative to the head in a direction shown by arrow 220, while the head may be positioned over a single concentric data track of the disk or may be sweeping across the disk in a direction into or out of the paper of this cross-sectional drawing. The disk may be rotating at various speeds known in the art, so that the relative speed in the direction of arrow 220 may range between a few meters per second and well over ten meters per second. A layer of air or other ambient gas accompanies the rapidly spinning disk surface 215 and interacts with the ABS 160 of the head 150, causing the head in this embodiment to levitate slightly from the disk. In other embodiments, the head maybe designed to operate in occasional, frequent or continuous physical contact with the disk. The head surface 160 is separated from the disk surface 215 by a physical spacing ($H_p$) that may range between several hundred angstroms and zero, with a preferred spacing of between about two hundred angstroms and about fifty angstroms. A lubricant including perfluorocarbon molecules or other known materials may be distributed on the disk surface 215 beneath the head.

A magnetic separation ($H_m$) between the media and the head is a significant factor in performance characteristics of the drive, affecting resolution of the head in both reading and writing magnetic signals on the disk. The magnetic separation $H_m$ is measured from the top of the media layer 210 to the bottom of the transducer 152, and includes any physical spacing $H_p$ as well as the thickness of any head overcoat 155 and media overcoat 212. The thickness of the head overcoat 155 and media overcoat 212 thus become increasingly important determinants of the magnetic spacing ($H_m$) as the physical spacing ($H_p$) is reduced. The achievement of hard, dense, corrosion resistant overcoats of SiC having a thickness as low as several angstroms without the need for an adhesion layer can dramatically decrease the magnetic separation $H_m$ and dramatically increase storage capacity of the drive.

Alternatively, as described above, the hard, dense, corrosion resistant SiC can form an adhesion layer for an ultrathin DLC or ta-C overcoat on both the head and disk. While this approach may increase the minimum thickness of the solid layers separating the transducer 152 and media layer 210, it affords employment of hard carbon surfaces that are becoming conventional in head-disk interfaces. Due to the hardness, density and corrosion resistance of the SiC interlayers, both the SiC and carbon layers can be made extremely thin, forming in essence an ultrathin double overcoat. Such an ultrathin double overcoat can instead be used in other embodiments on only one of the head or disk interface surfaces, with the other interface surface having a hard, dense, corrosion resistant SiC overcoat of the present invention. Any of these embodiments may help to lower stiction at the interface, as the intermolecular attraction between disparate surfaces of SiC and C may be less than that between two surfaces of C.

Although we have focused on teaching the preferred embodiments, other embodiments and modifications of this invention will be apparent to persons of ordinary skill in the art in view of these teachings. Therefore, this invention is to be limited only by the following claims, which include all such embodiments and modifications when viewed in conjunction with the above specification and accompanying drawings.

What is claimed is:

1. A head for an information storage system, the head comprising:
   a solid body including a plurality of adjoining solid layers, said layers forming a microscopic electromagnetic transducer that is covered by a layer containing silicon carbide having a thickness less than about 60 Å and exposed on a media-facing surface of said body.

2. The head of claim 1 wherein said thickness is in a range between about 10 Å and 50 Å.

3. The head of claim 1 wherein said silicon carbide is stoichiometric.

4. The head of claim 1 wherein said silicon carbide is nonstoichiometric.

5. The head of claim 1 wherein said layer has a density greater than about 1.7 grams per cubic centimeter.

6. The head of claim 1 wherein said layer has a hardness greater than about 18 gigapascals.

7. The head of claim 1 wherein said silicon carbide is formed by deposition of SiC on said transducer during bombardment of said transducer with a beam of inert, electrically neutral atoms.

8. A device for an electromagnetic information storage system, the device containing a plurality of adjoining solid layers comprising:
   a self-supporting substrate layer,
   a magnetic layer disposed over said substrate layer, and
   a layer containing silicon carbide disposed on said magnetic layer, having a thickness less than about 60 Å and forming a head-disk interface surface of said device.

9. The device of claim 8 wherein said thickness is in a range between about 10 Å and 50 Å.

10. The device of claim 8 wherein said silicon carbide is nonstoichiometric.

11. The device of claim 8 wherein said layer has a density greater than about 1.7 grams per cubic centimeter.

12. The device of claim 8 wherein said layer has a hardness greater than about 18 gigapascals.

13. The device of claim 8 wherein said silicon carbide is formed by deposition of SiC on said magnetic layer during bombardment of said transducer with a beam of inert, electrically neutral atoms.

14. A device for an electromagnetic information storage system, the device containing a plurality of adjoining solid layers comprising:
   a self-supporting substrate layer,
   a magnetic layer disposed adjacent said substrate layer,
   an outerlayer containing tetrahedral-amorphous carbon, and
   an interlayer containing SiC separating said magnetic layer from said outerlayer,
   wherein said outerlayer and said interlayer have a combined thickness of less than about 60 Å.

15. The device of claim 14 wherein said interlayer has a hardness greater than about 18 gigapascals and a density greater than about 1.7 grams per cubic centimeter.

16. The device of claim 14 wherein at least one of said interlayer and said outerlayer has a thickness in a range between about 10 Å and 50 Å.

17. The device of claim 14 wherein said interlayer is formed by deposition of SiC on said magnetic layer during bombardment of said magnetic layer with a beam of inert, electrically neutral atoms.

18. A method of making a head for an information storage system, the method comprising:
   providing a wafer substrate,
   forming a plurality of solid layers on said substrate in an arrangement operable as an electromagnetic transducer,
   forming a layer containing SiC on said transducer, including depositing a plurality of SiC molecules on said transducer and simultaneously flattening said layer by redistributing a portion of said SiC molecules,
   wherein redistributing said portion of said SiC molecules includes bombarding said SiC molecules with a beam of inert, electrically neutral atoms.

19. The method of claim 18 wherein said beam of inert, electrically neutral atoms is directed at an angle substantially different than perpendicular to said layer.

20. The method of claim 18 further comprising depositing on said layer a coating containing carbon having predominantly $sp^3$ bonds.

* * * * *